(12) United States Patent
Fujiwara (10) Patent No.: US 8,238,100 B2
(45) Date of Patent: Aug. 7, 2012

(54) CENTRIFUGAL FAN AND ELECTRONIC APPARATUS

(75) Inventor: Nobuto Fujiwara, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/975,146

(22) Filed: Dec. 21, 2010

(65) Prior Publication Data

US 2011/0157824 A1 Jun. 30, 2011

(30) Foreign Application Priority Data

Dec. 25, 2009 (JP) .................. 2009-295623

(51) Int. Cl.
*H05K 7/20* (2006.01)

(52) U.S. Cl. ........ 361/695; 361/693; 361/697; 361/701; 361/719; 165/80.3; 165/80.4

(58) Field of Classification Search .................. 361/695, 361/693, 697, 701, 719; 165/80.3, 80.4
See application file for complete search history.

(56) References Cited

U.S. PATENT DOCUMENTS

| 6,637,501 | B2 | 10/2003 | LIn et al. |
| 2003/0015311 | A1 | 1/2003 | Lin et al. |

FOREIGN PATENT DOCUMENTS

| JP | UM 56-152247 | 11/1981 |
| JP | UM 62-79512 | 5/1987 |
| JP | UM 63-100697 | 6/1988 |
| JP | 2-49997 | 2/1990 |
| JP | UM 3-106197 | 11/1991 |
| JP | 2001-099096 | 4/2001 |
| JP | 3087732 | 8/2002 |
| JP | 2007-247444 | 9/2007 |
| JP | 2008-121649 | 5/2008 |

OTHER PUBLICATIONS

Japanese Patent Application No. 2009-295623; Notice of Reasons for Rejection; Mailed Feb. 22, 2011 (English translation).

*Primary Examiner* — Xiaoliang Chen
(74) *Attorney, Agent, or Firm* — Blakely, Sokoloff, Taylor & Zafman LLP (57) ABSTRACT

According to one embodiment, a centrifugal fan includes an impeller and a fan casing containing the impeller. An intake port configured to draw air and a first outlet port and a second outlet port configured to expel the air are provided in the fan casing. The first outlet port is open in a direction different from a direction in which the intake port is open. The second outlet port is open in a direction same as the direction in which the intake port is open in a position apart from the impeller.

12 Claims, 6 Drawing Sheets

CENTRIFUGAL FAN AND ELECTRONIC APPARATUS

CROSS-REFERENCE TO RELATED APPLICATIONS

This application is based upon and claims the benefit of priority from Japanese Patent Application No. 2009-295623, filed Dec. 25, 2009; the entire contents of which are incorporated herein by reference.

FIELD

Embodiments described herein relate generally to a centrifugal fan including an impeller in a fan casing and an electronic apparatus such as a portable computer.

BACKGROUND

An electronic apparatus, such as a portable computer, is equipped with a centrifugal fan for cooling the CPU. The centrifugal fan is contained in a housing of the electronic apparatus together with other principal constituent elements, such as a printed circuit board and a hard disc drive.

The centrifugal fan includes a flat fan casing and an impeller that rotates inside the fan casing. The fan casing includes an upper wall and a lower wall facing each other interposing the impeller in between, and a peripheral wall surrounding an outer peripheral portion of the impeller. An intake port is provided on at least one of the upper wall and the lower wall. The intake port is open toward the rotation center of the impeller. Further, an outlet port is provided on the peripheral wall. The outlet port faces the outer peripheral portion of the impeller.

When the impeller rotates, the air inside the housing is drawn into the fan casing via the intake port. The drawn air is expelled from the outer peripheral portion of the impeller, and the velocity energy of the air is converted into a pressure energy inside the fan casing. Thereby, the air expelled into the fan casing from the impeller is discharged into the housing via the outlet port at a desired pressure.

According to the conventional centrifugal fan disclosed in Jpn. Pat. Appln. KOKAI Publication No. 2001-99096, a plurality of outlet ports are provided on the peripheral wall of the fan casing. The air expelled into the fan casing from the impeller is discharged radially with respect to the impeller from the outlet ports. As a result, flow of the air in the fan casing becomes smooth, and the amount of outlet of air increases.

In an electronic apparatus, such as a portable computer, that attaches importance to portability, the housing is required to be decreased in thickness and size. With this requirement, space inside the housing is becoming smaller and smaller, and a variety of constituent elements including a printed circuit board are arranged in a condensed state inside the housing.

Accordingly, even if the constituent elements that generate heat inside the housing are tried to be cooled by the air discharged from the outlet port of the fan casing, the outlet port will be practically occupied by other constituent elements that are adjacent to the centrifugal fan. Consequently, the flow of the air discharged from the outlet port will be disturbed thereby, and it will become difficult to secure a sufficient amount of air that travels toward the heat-producing constituent elements.

Further, according to the conventional centrifugal fan, the air is radially discharged into the housing with respect to the impeller. As a result, when a hotspot that locally receives heat of the constituent elements exists directly above or directly below the outlet port crossing the direction in which the air is expelled, for example, it will be difficult to directly blow the air discharged from the outlet port onto the hotspot.

Furthermore, in order to lead the air discharged from the outlet port to the hotspot, a duct needs to be provided outside the fan casing, so as to vary the direction of the wind. Accordingly, space needs to be secured around the fan casing in order to arrange the duct, which inevitably is disadvantageous in decreasing the size of the housing.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a centrifugal fan comprises an impeller and a fan casing containing the impeller. An intake port configured to draw air and a first outlet port and a second outlet port configured to expel the air are provided in the fan casing. The first outlet port is open in a direction different from a direction in which the intake port is open. The second outlet port is open in a direction same as the direction in which the intake port is open in a position apart from the impeller.

(First Embodiment)

Hereinafter, the first embodiment will be described with reference to FIGS. 1-4.

Figure 1:
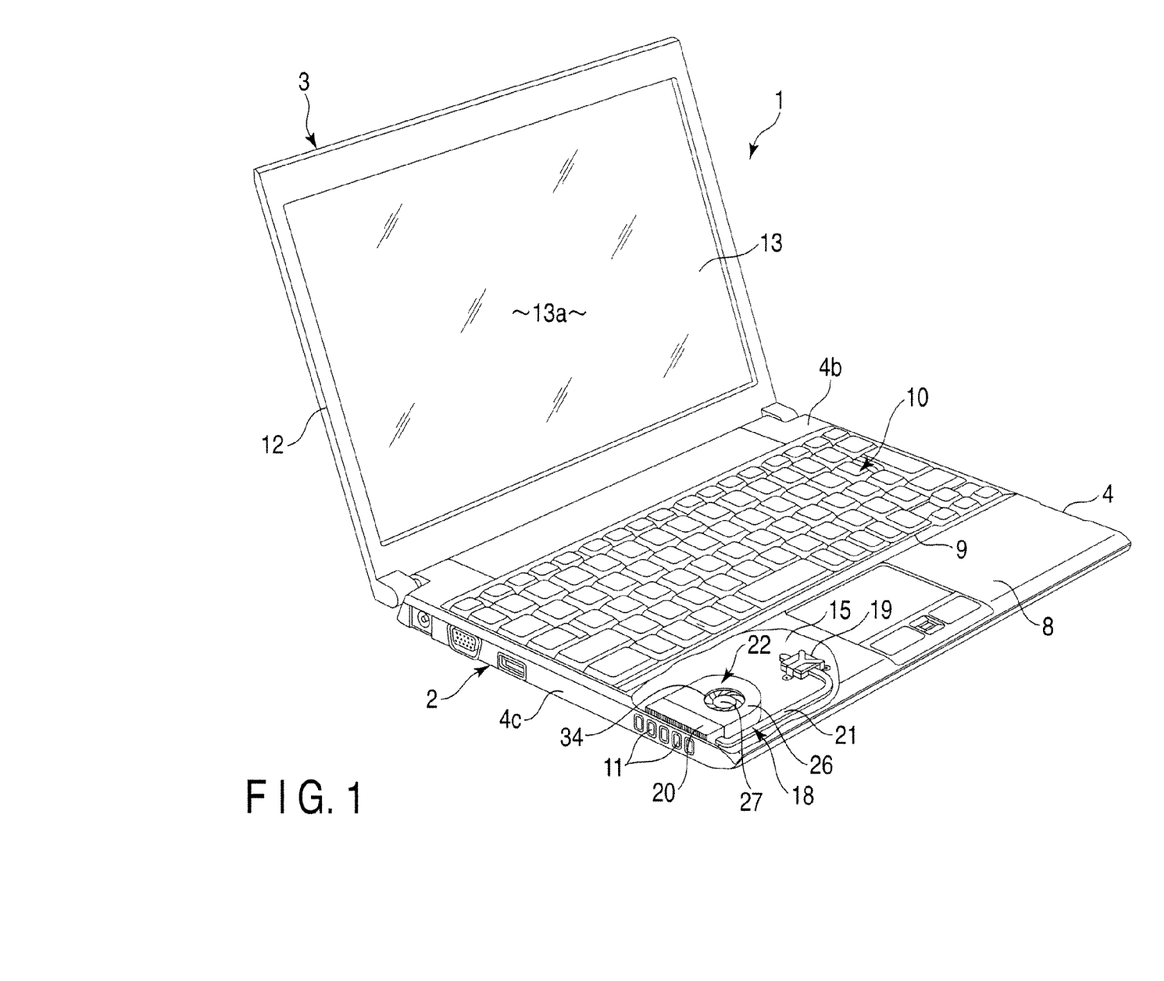
FIG. 1 is an exemplary perspective view of a portable computer according to a first embodiment.

FIG. 1 discloses a portable computer 1 as an example of an electronic apparatus. The portable computer 1 includes a computer main body 2 and a display module 3.

Figure 3:
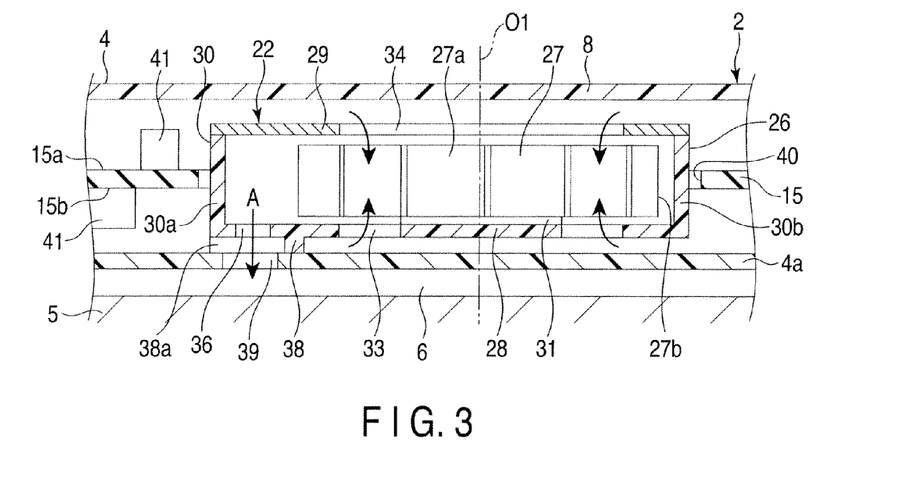
FIG. 3 is an exemplary cross-sectional view along line F3-F3 of FIG. 2.

The computer main body 3 includes a housing 4. The housing 4 is in the shape of a flat box including a bottom wall 4a, an upper wall 4b, and a side wall 4c. The bottom wall 4a is an example of an outer wall of the housing 4, and includes legs, not shown, at the four corners thereof. Accordingly, when the computer main body 2 is arranged on a top panel 5 as shown in FIG. 3, a gap 6 is generated between the top panel 5 and the bottom wall 4a, that corresponds to the height of the legs.

The upper wall 4b includes a palm rest 8 and a keyboard mount portion 9. The palm rest 8 is positioned at an anterior half portion of the housing 4, so as to extend in the width direction of the housing 4. The keyboard mount portion 9 supports a keyboard 10 at the back of the palm rest 8.

The side wall 4c is vertically raised so as to straddle the side edge of the bottom wall 4a and the side edge of the upper wall 4b. A plurality of exhaust ports 11 are provided at a front portion of the side wall 4c. The exhaust ports 11 are continuous with the inside of the housing 4 at the left side of the palm rest 8.

The display module 3 includes a display housing 12 and a liquid crystal display panel 13. The display housing 12 is in the shape of a flat box including an approximately the same size as the housing 4. The liquid crystal display panel 13 is contained in the display housing 12. The liquid crystal display panel 13 includes a screen 13a. The screen 13a is exposed outside the display housing 12 from the front surface of the display housing 12.

The display module 3 is rotatable between a closed position and an open position by being supported by a rear end portion of the housing 4. In the closed position, the display module 3 lays over the housing 4, so as to cover the palm rest 8 and the keyboard 10. In the open position, the display module 3 is vertically raised from the rear end portion of the housing 4, so as to expose the palm rest 8, the keyboard 10, and the screen 13a.

As shown in FIGS. 1-4, a printed circuit board 15 is contained in the housing 4. The printed circuit board 15 is supported on a plurality of bosses, not shown, projecting from the bottom wall 4a. The printed circuit board 15 includes an upper surface 15a and a lower surface 15b. The upper surface 15a of the printed circuit board 15 faces the inner surface of the palm rest 8. The lower surface 15b of the printed circuit board 15 faces the inner surface of the bottom wall 4a.

Figure 2:
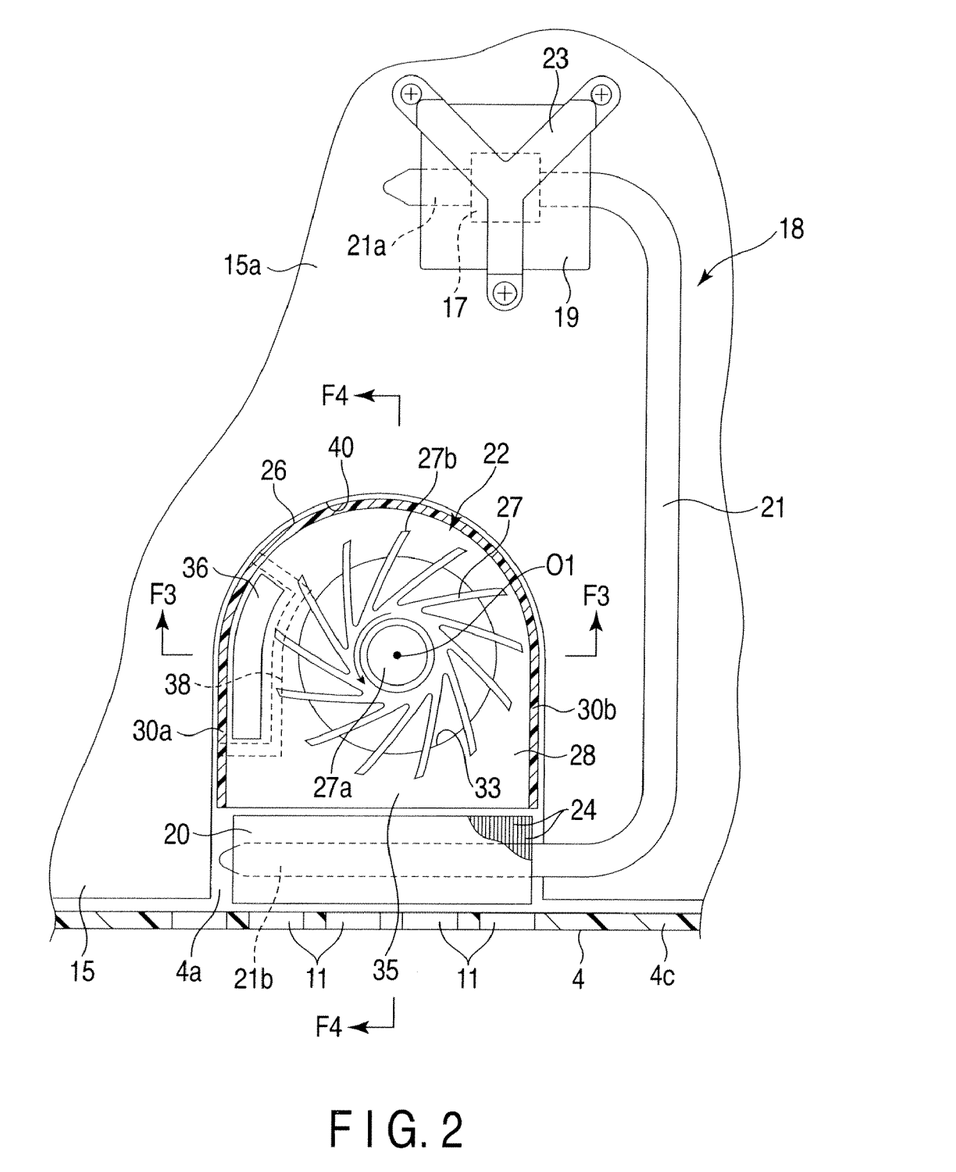
FIG. 2 is an exemplary cross-sectional view of a centrifugal fan according to the first embodiment.

As shown in FIG. 2, a semiconductor package 17 that generates heat during operation is mounted on the upper surface 15a of the printed circuit board 15. Further, a cooling module 18 is contained in the housing 4. The cooling module 18 is designed to cool the semiconductor package 17, and includes a heat reception block 19, a heat sink 20, a heat pipe 21, and a centrifugal fan 22.

The heat reception block 19 is formed of a metal material excellent in thermal conductivity, such as copper or aluminum. The heat reception block 19 is supported by the printed circuit board 15 via a springy holder 23, and is thermally connected to the semiconductor package 17.

The heat sink 20 includes a plurality of thermally radiative fins 24. The thermally radiative fins 24 are arranged in a row at equal intervals, so as to extend along the inner surface of the side wall 4c, and face the exhaust ports 11 of the side wall 4c.

The heat pipe 21 includes a heat reception end portion 21a and a thermally radiative end portion 21b. The heat reception end portion 21a is thermally connected to the heat reception block 19. The thermally radiative end portion 21b penetrates through the thermally radiative fins 24, and is thermally connected to the thermally radiative fins 24. Accordingly, the heat generated by the semiconductor package 17 is transferred to the heat reception block 19, and is transferred from the thermally radiative block 19 to the heat sink 20 via the heat pipe 21.

The centrifugal fan 22 is designed to blow air onto the heat sink 20, and includes a fan casing 26 and an impeller 27. The fan casing 26 is in the shape of a flat box compliant with the flat housing 4. As shown in FIGS. 2 and 3, the fan casing 26 includes a first end wall 28, a second end wall 29, and a peripheral wall 30.

The first end wall 28 and the second end wall 29 are arranged in parallel at equal intervals in the thickness direction of the fan casing 26. The first end wall 28 forms the bottom of the fan casing 26. The second end wall 29 forms the ceiling of the fan casing 26. The peripheral wall 30 is raised so as to straddle the peripheral edge of the first end wall 28 and the peripheral edge of the second end wall 29. The peripheral wall 30 includes a pair of linear portions 30a and 30b. The linear portions 30a and 30b are arranged in parallel at equal intervals.

The impeller 27 includes a boss portion 27a positioned at the rotation center thereof. An axis 01 passing through the boss portion 27a extends in the thickness direction of the fan casing 26. The impeller 27 is contained in the fan casing 26 such that the axis 01 crosses the first and second end walls 28 and 29. The boss portion 27a of the impeller 27 is supported by the first end wall 28 of the fan casing 26 via a fan motor 31. Accordingly, the impeller 27 is rotated in the arrow direction of FIG. 2 by receiving a torque of the fan motor 31.

Further, an outer peripheral portion 27b of the impeller 27 is surrounded by the peripheral wall 30 of the fan casing 26. A portion of the outer peripheral portion 27b of the impeller 27 intrudes between the linear portions 30a and 30b of the peripheral wall 30.

According to the first embodiment, the impeller 27 is provided in a position deviated from the center of the fan casing 26, so as to be deviated more in the direction of the other linear portion 30b than one linear portion 30a of the peripheral wall 30. As a result thereof, the interval between said one linear portion 30a of the peripheral wall 30 and the eternal peripheral portion 27b of the impeller 27 is locally extended.

Figure 4:
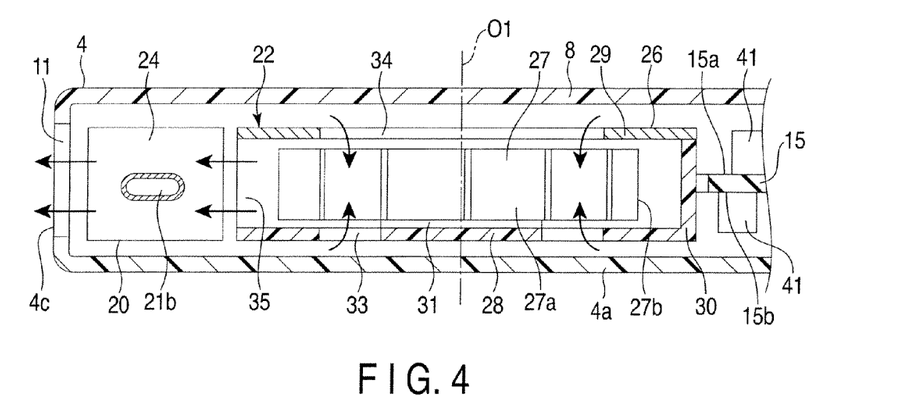
FIG. 4 is an exemplary cross-sectional view along line F4-F4 of FIG. 2.

As shown in FIGS. 3 and 4, a first intake port 33 is provided on the first end wall 28, which becomes the bottom of the fan casing 26. The first intake port 33 is open in the fan casing 26 from the axial direction of the impeller 27, and faces the lower end of the boss portion 27a of the impeller 27. Further, the first intake port 33 is open into a gap between the fan casing 26 and the bottom wall 4a of the housing 4.

Similarly, a second intake port 34 is provided on the second end wall 29, which becomes the ceiling of the fan casing 26. The second intake port 34 is open into the fan casing 26 from the axial direction of the impeller 27, and faces an upper end of the boss portion 27a of the impeller 27. Further, the second intake port 34 is open into a gap between the fan casing 26 and the palm rest 8 of the housing 4.

A first outlet port 35 is provided between the linear portions 30a and 30b of the peripheral wall 30 of the fan casing 26. The first outlet port 35 has a horizontally long aperture shape. The first outlet port 35 is open into the fan casing 26 from the direction crossing the axis 01 of the impeller 27, and faces the outer peripheral portion 27b of the impeller 27. In other words, the first outlet port 35 is open into a direction different from the first and second intake ports 33 and 34.

Further, the first outlet port 35 faces the heat sink 20 inside the housing 4. The aperture area of the first outlet port 35 is greater than the aperture area of the sum of the first and second intake ports 33 and 34.

As shown in FIGS. 2 and 3, a second outlet port 36 is provided on the first end wall 28 of the fan casing 26. The second outlet port 36 is open into the inside of the fan casing 26 from the axial direction of the impeller 27 in a position apart from the impeller 27. Accordingly, the second outlet port 36 is open in the direction same as that of the first intake port 33.

According to the first embodiment, the second outlet port 36 is positioned between the outer peripheral portion 27b of the impeller 27 and said one linear portion 30a of the peripheral wall 30. In other words, the second outlet port 36 is deviated in a direction opposite to the direction in which the impeller 27 is deviated from the center of the fan casing 26. The second outlet port 36 is an independent hole, and is separated from the first outlet port 35. Further, the second outlet port 36 has an elongated aperture shape extending along the linear portion 30a, for example, and is adjacent to the first intake port 33 on the first end wall 28.

A partition wall 38 is integrally provided on the lower surface of the first end wall 28. The partition wall 38 projects downward from the first end wall 28, and partitions the second outlet port 36 and the first intake port 33. The projection end of the partition wall 38 abuts the bottom wall 4a of the housing 4. The partition wall 38 is an example of an element configured to interrupt the flow of air traveling toward the first intake port 33 from the second outlet port 36, and includes an open end 38a configured to be open toward the periphery of the fan casing 26.

In the first embodiment, an air exit 39 is provided on the bottom wall 4a. The air exit 39 is positioned directly below the second outlet port 36. Further, according to the first embodiment, an escape portion 40 is formed in the printed circuit board 15. As shown in FIG. 2, the escape portion 40 is formed by cutting a side of the printed circuit board 15 so as to avoid the fan casing 26, and has a shape that agrees with the fan casing 26. The edge of the printed circuit board 15 that defines the escape portion 40 surrounds the peripheral wall 30 of the fan casing 26. As a result, a plurality of circuit components 41 mounted on each of the upper surface 15a and the lower surface 15b of the printed circuit board 15 are arranged in a condensed state in the periphery of the fan casing 26.

Further, the escape portion 40 is open into the side edge of the printed circuit board 15 facing the exhaust ports 11 of the housing 4. The heat sink 20 is positioned at the opening end of the escape portion 40.

When the impeller 27 of the centrifugal fan 22 rotates, the air inside the housing 4 is drawn into the fan casing 26 from the first intake port 33 and the second intake port 34, as shown by the arrows in FIGS. 3 and 4. The drawn air is expelled from the outer peripheral portion 27b of the impeller 27, and velocity energy of the air is converted into pressure energy inside the fan casing 26.

Thereby, air of a predetermined pressure is blown onto the heat sink 20 from the first outlet port 35. The air blown onto the heat sink 20 passes between the thermally radiative fins 24, and is discharged outside the portable computer 1, from the exhaust ports 11 of the housing 4. As a result, the heat of the semiconductor package 17 transferred to the heat sink 20 is discharged outside the housing 4 by thermal conversion with air.

On the other hand, the fan casing 26 includes the second outlet port 36, which is open into the inside of the fan casing 26, in a position apart from the impeller 27. The second outlet port 36 is open into the direction same as that of the first intake port 33, in a position adjacent to the first intake port 33.

Accordingly, a portion of the air expelled into the inside of the fan casing 26 from the outer peripheral portion 27b of the impeller 27 is expelled toward the bottom wall 4a of the housing 4, which overlaps with the fan casing 26, from the second outlet port 36, as shown by the arrow A in FIG. 3.

In the first embodiment, the air exit 39 facing the second outlet port 36 is provided on the bottom wall 4a. Accordingly, the air from the second outlet port 36 is discharged into the gap 6 between the bottom wall 4a of the housing 4 and the top panel 5 of the desk, via the air exit 39. The air discharged into the gap 6 flows along the outer surface of the bottom wall 4a, and cools the bottom wall 4a from outside the housing 4.

According to the first embodiment, the air drawn into the inside of the fan casing 26 can be expelled in the diameter direction of the impeller 27 from the first outlet port 35, and can be expelled in the axial direction of the impeller 27 from the second outlet port 36.

Accordingly, even when the circuit components 41 are arranged in a condensed state in the periphery of the peripheral wall 30 of the fan casing 26, the second outlet port 36 of the fan casing 26 is prevented from being occupied by the circuit components 41. Thereby, flow of air inside the fan casing 26 becomes smooth, and the amount of air discharged from the centrifugal fan 22 can be increased.

Furthermore, the first intake port 33 and the second outlet port 36 are partitioned by the partition wall 38. Thereby, the air expelled into the gap 6 from the second outlet port 36 is prevented from being drawn directly via the first intake port 33. Accordingly, flow of air between the first intake port 33 and the second outlet port 36 is restricted, and the air expelled from the second outlet port 36 can be effectively used for cooling the housing 4.

Moreover, according to the first embodiment, the impeller 27 is deviated from the center of the fan casing 26, and the second outlet port 36 is provided in the space generated on the first end wall 28 by this deviation. As a result, the second outlet port 36 can be added to the fan casing 26 without increasing the size of the fan casing 26.

According to the first embodiment, the second outlet port 36 is open into the direction same as that of the first intake port 33 on the first end wall 28 of the fan casing 26. Thereby, the air can be discharged toward the bottom wall 4a of the housing 4 in the range surrounded by the outer peripheral edge portion of the fan casing 26.

That is, in order to cool the bottom wall 4a of the housing 4 using the air discharged from the first outlet port 35, for example, a guide needs to be provided in the periphery of the fan casing 26, so as to vary the direction in which the air discharged from the first outlet port 35 flows. Accordingly, space needs to be secured such that the guide can be provided in the periphery of the fan casing 26. This inevitably results in increase in size of the housing 4. Further, depending on the layout of the inside of the housing 4, the guide might not be able to be provided.

According to the centrifugal fan 22 of the first embodiment, on the other hand, the air can be directly blown toward the bottom wall 4a of the housing 4 from the second outlet port 36 of the centrifugal fan 22, and a dedicated guide, for example, for varying the direction of wind is not needed. Thereby, the bottom wall 4a of the housing 4 can be cooled while maintaining the housing 4 in a compact size.

(Second Embodiment)

Figure 5:
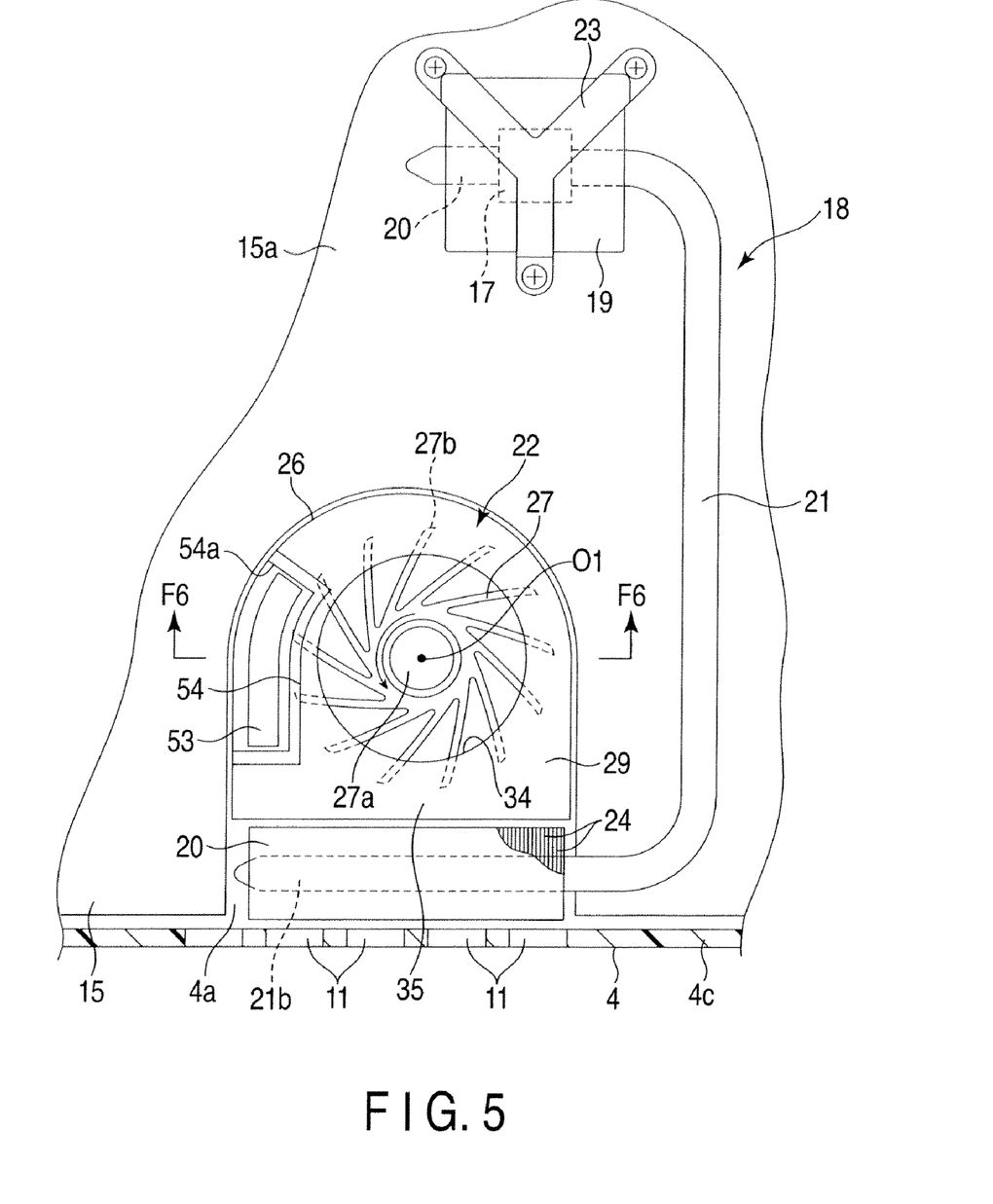
FIG. 5 is an exemplary plan view of a centrifugal fan according to a second embodiment.
Figure 6:
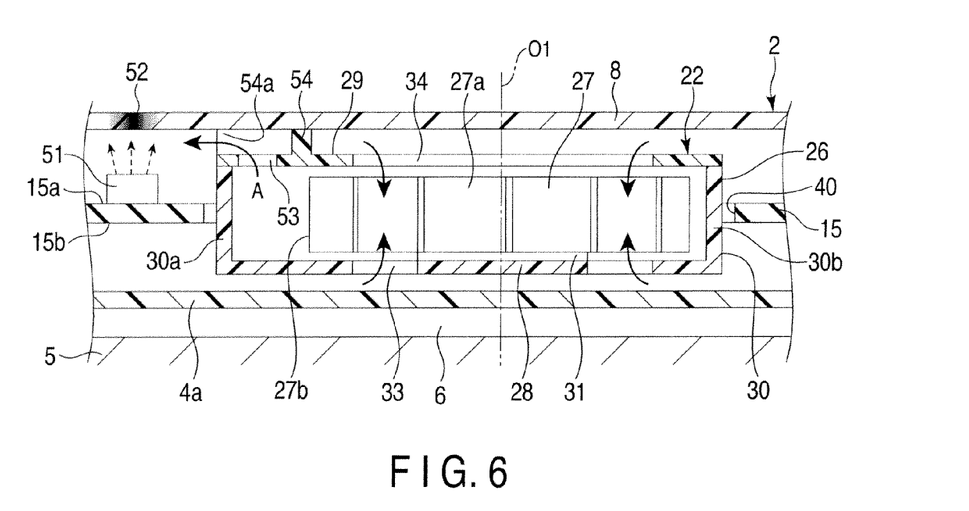
FIG. 6 is an exemplary cross-sectional view along line F6-F6 of FIG. 5.

FIGS. 5 and 6 disclose the second embodiment. The second embodiment is different from the first embodiment in that a palm rest 8 of a housing 4 is cooled using a portion of the air discharged from a centrifugal fan 22. The configuration of the portable computer other than that is the same as that of the first embodiment. Accordingly, in the second embodiment, the structural elements same as those of the first embodiment will be referred to by the same reference numerals and detailed descriptions of such elements will be omitted.

In the second embodiment, the palm rest 8 forms an outer wall of the housing 4. A circuit component 51 that involves heat generation during operation is mounted on an upper surface 15a of a printed circuit board 15 facing the palm rest 8. The circuit component 51 is adjacent to a peripheral wall 30 of a fan casing 26, and is positioned directly below the palm rest 8.

Thereby, as shown by the dashed arrow in FIG. 6, the palm rest 8 receives the thermal effect of the circuit component 51, and a local hotspot 52 is easily generated in a portion of the palm rest 8 facing the circuit component 51.

As shown in FIGS. 5 and 6, a second outlet port 53 is provided on the second end wall 29, which becomes the ceiling of the fan casing 26. The second outlet port 53 is open in a direction same as that of the second intake port 34, in a position apart from an impeller 27.

More specifically, the second outlet port 53 is positioned between an outer peripheral portion 27b of the impeller 27 and one linear portion 39a of the peripheral wall 30. Accordingly, the second outlet port 53 is deviated in a direction opposite to a direction in which the impeller 27 is deviated from the center of the fan casing 26.

The second outlet port 53 has an elongated aperture shape extending along the linear portion 30a of the peripheral wall 30, for example, and is adjacent to the second intake port 34 on the second end wall 28. A partition wall 54 is integrally formed on the upper surface of the second end wall 29. The partition wall 54 projects upward from the second end wall 29, and partitions the second outlet port 53 and the second intake port 34. The projection end of the partition wall 54 abuts the palm rest 8.

The partition wall 54 is an example of an element configured to interrupt the flow of air traveling toward the second intake port 34 from the second outlet port 53, and includes an open end 54a that is open toward the periphery of the fan casing 26. The open end 54a of the partition wall 54 is adjacent to the hotspot 52 that is generated in the palm rest 8 and the circuit component 51 that generates heat.

According to the second embodiment, a portion of the air expelled into the inside of the fan casing 26 from the outer peripheral portion 27b of the impeller 27 is discharged from the second outlet port 53 toward the palm rest 8 positioned above the fan casing 26, as shown by the arrow A in FIG. 6. The air from the second outlet port 53 is blown onto the palm rest 8, and is discharged into the housing 4 from the open end 54a of the partition wall 54. The air discharged into the housing 4 flows through the periphery of the heat-generating circuit component 51, and cools the circuit component 51.

Further, a portion of the air discharged into the housing 4 flows along the inner surface of the palm rest 8 toward the hotspot 52 of the palm rest 8, and cools the hotspot 52 from the inside of the housing 4.

According to the second embodiment, the palm rest 8 of the housing 4 can be cooled using the air discharged from the second outlet port 53 of the fan casing 26. As a result, the thermal effect of the circuit component 51 against the palm rest 8 can be moderated.

(Third Embodiment)

Figure 7:
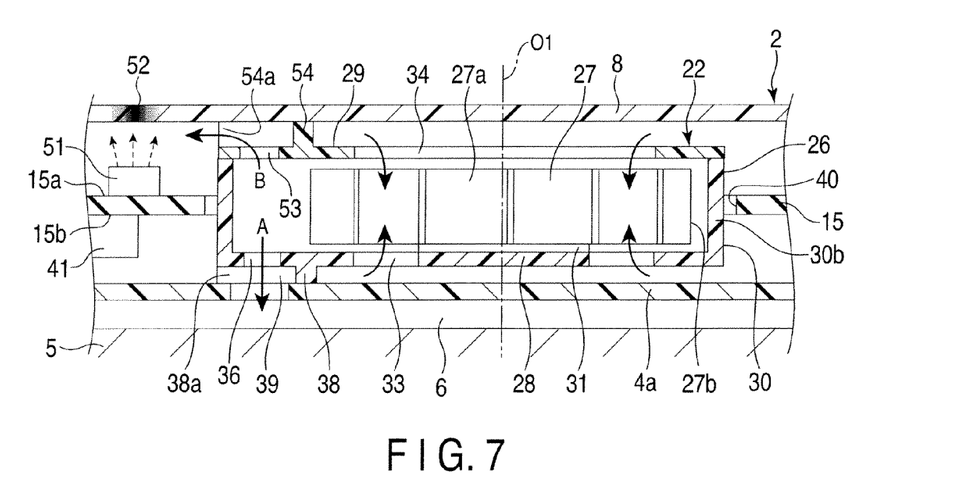
FIG. 7 is an exemplary cross-sectional view of a portable computer according to a third embodiment.

FIG. 7 discloses the third embodiment.

The third embodiment combines the first embodiment and the second embodiment, and the configuration of the portable computer is the same as those of the first and second embodiments.

As shown in FIG. 7, a fan casing 26 of a centrifugal fan 22 includes a pair of second outlet ports 36 and 53. The air expelled in the axial direction of an impeller 27 from one outlet port 36 is discharged from an air exit 39 into a gap 6 between a bottom wall 4a of a housing 4 and a top panel 5 of the desk, as shown by the arrow A in FIG. 7. The air discharged into the gap 6 flows along the outer surface of a bottom wall 4a, and cools the bottom wall 4a from outside the housing 4.

On the other hand, the air expelled in the axial direction of the impeller 27 from the other outlet port 53 flows along the inner surface of the palm rest 8, as shown by the arrow B in FIG. 7, and thereby cools a hotspot 52 of the palm rest 8 from the inside of the housing 4.

Accordingly, according to the third embodiment, both of the bottom wall 4a of the housing 4 and the palm rest 8 can be simultaneously cooled, using the air discharged from the second outlet ports 36 and 53 of the fan casing 26. Accordingly, the housing 4 can be cooled as a whole, and the temperature of the housing 4 is prevented from increasing.

(Fourth Embodiment)

Figure 8:
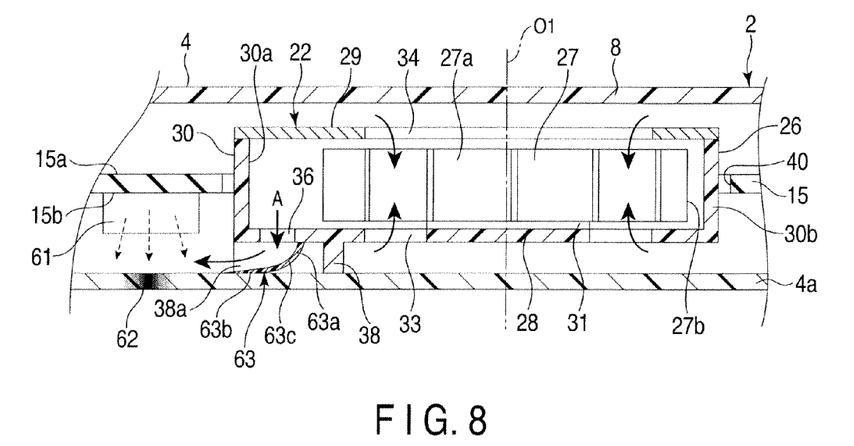
FIG. 8 is an exemplary cross-sectional view of a portable computer according to a fourth embodiment.

FIG. 8 discloses a fourth embodiment.

The fourth embodiment has relativity to the first embodiment. As shown in FIG. 8, a circuit component 61 that involves heat during operation is mounted on a lower surface 15b of a printed circuit board 15. The circuit component 61 faces a bottom wall 4a of a housing 4, in the vicinity of a peripheral wall 30 of a fan casing 26. Thereby, as shown by the dashed arrow in FIG. 8, the bottom wall 4a receives the thermal effect of the circuit component 61, and a local hotspot 62 is easily generated in a portion of the bottom wall 4a facing the circuit component 61.

Further, the circuit component 61 is adjacent to an open end 38a of a partition wall 38. An air leading guide 63 is arranged in the region surrounded by the partition wall 38 and the bottom wall 4a of the housing 4. The air leading guide 63 is designed to lead the air discharged from the second outlet port 36 toward the bottom wall 4a to the hotspot 62.

The air leading guide 63 includes an upstream end portion 63a, a downstream end portion 63b, and an intermediate portion 63c. The upstream end portion 63a abuts the lower surface of a first end wall 28 of the fan casing 26 in continuous with an open end of the second outlet port 36. The downstream end portion 63b extends along an inner surface of the bottom wall 4a of the housing 4, and is continuous with the inner surface of the bottom wall 4a. The intermediate portion 63c is positioned between the upstream end portion 63a and the downstream end portion 63b. The intermediate portion 63c is curved in a circular shape directly below the second outlet port 36, so as to smoothly connect the upstream end portion 63a and the downstream end portion 63b.

According to the fourth embodiment, a portion of the air expelled from the outer peripheral portion 27b of the impeller 27 to the inside of the fan casing 26 is discharged from the second outlet port 53 toward the region below the fan casing 26, as shown by the arrow A in FIG. 8. The discharged air is blown into the intermediate portion 63c of the air leading guide 63, and varies its flow direction by approximately 90 degrees by being led by the intermediate portion 63c.

That is, the air discharged from the second outlet port 36 is led by the air leading guide 63 and flows along the inner surface of the bottom wall 4a toward the hotspot 62 of the bottom wall 4a, and cools the hotspot 62 from the inside of the housing 4.

Thus, according to the fourth embodiment, the bottom wall 4a of the housing 4 can be cooled using the air discharged from the second outlet port 53 of the fan casing 26. Accordingly, the thermal effect of the circuit component 61 against the bottom wall 4a can be moderated.

(Fifth Embodiment)

Figure 9:
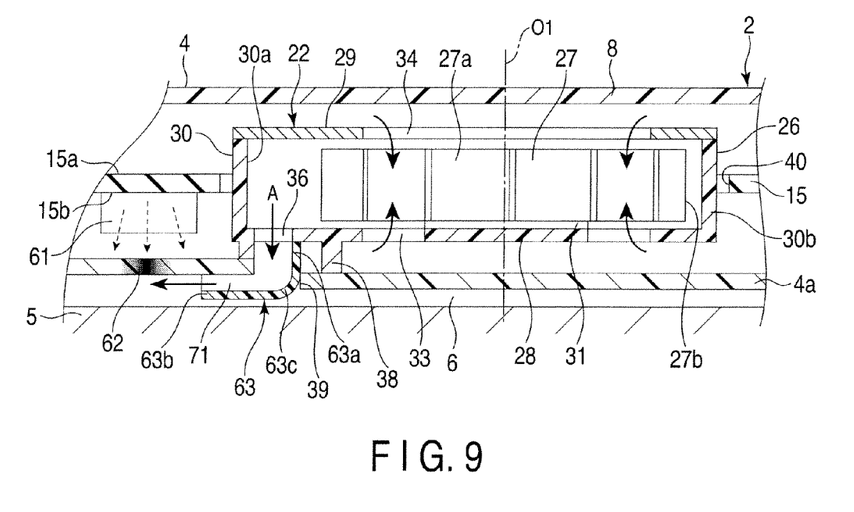
FIG. 9 is an exemplary cross-sectional view of a portable computer according to a fifth embodiment.

FIG. 9 discloses the fifth embodiment.

The fifth embodiment is different from the fourth embodiment in that a bottom wall 4a, which receives the thermal effect of a circuit component 61, is cooled from outside a housing 4. Other than that, the configuration of the portable computer is the same as that of the fourth embodiment.

As shown in FIG. 9, an air leading guide 63, which is continuous with an open end of a second outlet port 36, is drawn toward the region below the housing 4 from an air exit 39, which is made in the bottom wall 4a. More specifically, a portion of the air leading guide 63 extending from an intermediate portion 63c to a downstream end portion 63b is drawn to below the housing 4, and extends in parallel with the bottom wall 4a. The downstream end portion 63b of the air leading guide 63 is positioned in the gap 6 between the bottom wall 4a and the top panel 5 of the desk, and a cooling air path 71 is formed between the lower surface of the bottom wall 4a and the downstream end portion 63b. The cooling air path 71 extends toward the hotspot 62 of the bottom wall 4a from the air exit 39.

According to the fifth embodiment, a portion of the air expelled into the inside of the fan casing 26 from the outer peripheral portion 27b of the impeller 27 is discharged from the second outlet port 36 toward the region below the fan casing 26, as shown by arrow A in FIG. 9. The discharged air is blown into the intermediate portion 63c of the air leading guide 63, and varies its flow direction by approximately 90 degrees, by being led by the intermediate portion 63c. Further, the air flows through the cooling air path 71 along the outer surface of the bottom wall 4a toward the hotspot 2 of the bottom wall 4a, and cools the hotspot 62 from outside the housing 4.

Thus, according to the fifth embodiment, the bottom wall 4a of the housing 4 can be cooled using the air discharged from the second outlet port 53 of the fan casing 26. Accordingly, the thermal effect of the circuit component 61 against the bottom wall 4a can be moderated.

The partition wall interrupting the flow of air traveling toward the intake port from the second outlet port does not need to be integrally formed in the fan casing. For example, the partition wall may be integrally formed with the bottom wall of the housing or the palm rest, and may be formed of a material different from that of the housing and the fan casing. When the partition wall is formed of a different material, the material should desirably be elastically deformable, such as a rubber elastic body or a sponge.

In the above-described embodiments, an intake port is provided in both of the first and second end walls of the fan casing, but the intake port may be provided only on the first end wall or the second end wall.

Further, the position of the second outlet port is not limited to the ones described in the above-described embodiments, and may be provided between the outer peripheral portion of the impeller and the first outlet port, for example.

Moreover, the number of the first outlet ports is not limited to one. For example, a plurality of first outlet ports may be formed on the peripheral wall of the fan casing such that air is discharged radially in a diameter direction of the impeller from the fan casing.

While certain embodiments have been described, there embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   a fan casing provided with an intake port, a first outlet port having an aperture area smaller than an aperture of the intake port and being opened in a direction different from a direction in which the intake port is opened, and a second outlet port being opened in a same direction as a direction in which the intake port is opened, the fan casing being contained in a housing;
   a wall provided between the intake port and the second outlet port; and
   an impeller contained in the fan casing, the impeller is provided at a position eccentric with respect to the fan casing,
   wherein the second outlet port is positioned on a side opposite to a direction in which the impeller is eccentric with respect to the fan casing.

2. The electronic apparatus of claim 1, further comprising a circuit board provided in the housing, the circuit board including an escape portion avoid the fan casing, an edge of the circuit board defining the escape portion surrounding the fan casing.

3. The electronic apparatus of claim 1, wherein the housing includes an external wall, and the second outlet port of the fan casing is open toward an inner surface of the external wall.

4. The electronic apparatus of claim 3, wherein an air leading guide configured to let the air expelled from the second outlet port flow along the inner surface of the external wall is provided between the inner surface of the external wall and the fan casing.

5. The electronic apparatus of claim 3, wherein an air exit connected to the second outlet port of the fan casing is provided on the external wall.

6. The electronic apparatus of claim 5, wherein the housing includes an air leading guide configured to let the air led by the air exit from the second outlet port flow along an external surface of the external wall.

7. The electronic apparatus of claim 2, wherein the fan casing is positioned in the escape portion of the circuit board.

8. The electronic apparatus of claim 7, wherein the fan casing includes a first end wall and a second end wall interposing the impeller in between, and the circuit board is positioned further apart from an inner surface of the housing than the first end wall and the second end wall.

9. The electronic apparatus of claim 8, wherein the first end wall and the second end wall of the fan casing are mutually arranged at intervals in a thickness direction of the fan casing, and are apart from the inner surface of the housing.

10. The electronic apparatus of claim 1, wherein the second outlet port has an elongated aperture shape extending along a peripheral edge of the fan casing.

11. The electronic apparatus of claim 1, further comprising a heat generating element contained in the housing, the fan casing being configured to cool the heat generating element by the air expelled from the second outlet port.

12. The electronic apparatus of claim 11, wherein the second outlet port of the fan casing is adjacent to the heat generating element in the housing.

* * * * *